US012061869B2

(12) United States Patent
Wei

(10) Patent No.: US 12,061,869 B2
(45) Date of Patent: Aug. 13, 2024

(54) DEEP-LEARNING BASED TEXT CORRECTION METHOD AND APPARATUS

(71) Applicant: KONICA MINOLTA BUSINESS SOLUTIONS U.S.A., INC., Foster City, CA (US)

(72) Inventor: Junchao Wei, San Mateo, CA (US)

(73) Assignee: KONICA MINOLTA BUSINESS SOLUTIONS U.S.A., INC., Foster City, CA (US)

( * ) Notice: Subject to any disclaimer, the term of this patent is extended or adjusted under 35 U.S.C. 154(b) by 355 days.

(21) Appl. No.: 17/515,230

(22) Filed: Oct. 29, 2021

(65) Prior Publication Data

US 2023/0132943 A1   May 4, 2023

(51) Int. Cl.
*G06K 9/00* (2022.01)
*G06F 18/214* (2023.01)
(Continued)

(52) U.S. Cl.
CPC .......... *G06F 40/232* (2020.01); *G06F 18/214* (2023.01); *G06V 30/12* (2022.01); *G06V 30/1983* (2022.01); *G06V 30/10* (2022.01)

(58) Field of Classification Search
CPC ........ G06F 40/30; G06F 40/284; G06F 40/51; G06F 40/253; G06F 40/216; G06F 40/56; G06F 18/214; G06F 40/58; G06F 40/247; G06F 40/166; G06F 40/205; G06F 40/279; G06F 40/289; G06F 40/44; G06F 40/45; G06F 40/274; G06F 16/345; G06F 40/237; G06F 16/532; G06F 40/151; G06F 16/444; G06F 16/45; G06F 16/483; G06F 18/2148; G06F 18/2178; G06F 40/295; G06F 40/35; G06F 40/47; G06F 40/49; G06F 16/1752;
(Continued)

(56) References Cited

U.S. PATENT DOCUMENTS

| 2003/0016821 A1* | 1/2003 | Hammersmith ...... H04L 9/0822 380/37 |
| 2019/0155877 A1* | 5/2019 | Sharma ................. G06F 40/151 |
| 2020/0074180 A1* | 3/2020 | Takegawa .............. G06N 3/044 |

OTHER PUBLICATIONS

"Levenshtein distance", from Wikipedia, the free encyclopedia; last edited Sep. 20, 2021, at 10:14 (UTC), accessed Oct. 11, 2021.
(Continued)

*Primary Examiner* — Alex Kok S Liew
(74) *Attorney, Agent, or Firm* — SQUIRE PATTON BOGGS (US) LLP

(57) ABSTRACT

A text correction method and apparatus can take advantage of a greatly reduced number of error-ground truth pairs to train a deep learning model. To generate these error-ground truth pairs, different characters in a ground truth word are replaced with a symbol, not appearing in any ground truth words, to generate error words which are paired with that ground truth word to provide error-ground truth word pairs. This process may be repeated for all ground truth words for which training is to be performed. In embodiments, pairs of characters in a ground truth word may be replaced with a symbol to generate the error words which are paired with that ground truth word to provide error-ground truth word pairs. Again, this process may be repeated for all ground truth words for which training is to be performed.

20 Claims, 10 Drawing Sheets

(51) Int. Cl.
*G06F 40/232* (2020.01)
*G06V 30/12* (2022.01)
*G06V 30/196* (2022.01)
*G06V 30/10* (2022.01)

(58) Field of Classification Search
CPC .............. G06F 16/24575; G06F 16/30; G06F 16/3347; G06F 16/5846; G06F 16/5854; G06F 16/9027; G06F 16/95; G06F 21/577; G06F 21/606; G06F 2221/033; G06F 3/016; G06F 16/243; G06F 16/313; G06F 16/3329; G06F 16/335; G06F 16/353; G06F 16/9024; G06F 16/9535
See application file for complete search history.

(56) References Cited

OTHER PUBLICATIONS

Devlin et al., "BERT: Pre-training of Deep Bidirectional Transformers for Language Understanding", arXiv:1810.04805v2 [cs.CL] May 24, 2019.
Hannun, Awni; "Sequence Modeling With CTC", Distill, Nov. 27, 2017; doi: 10.23915/distill.00008.
Hochreiter et al, "Long Short-Term Memory", Neural Computation 9, 1735-1780 (1997).
Imagenet, "ImageNet—About ImageNet", https://www.image-net.org/https://www.image-net.org/about.php, accessed Oct. 11, 2021; 3 pages.

\* cited by examiner

Level 0 Information: Original Text Input

Level 1 Information:

%igure    F%gure    Fi%ure    Fig%re    Figu%e    Figur%

Level 2 Information:

%%gure    F%%ure    Fi%%re    Fig%%e    Figur%%

Level 3 Information:

F%i%r%    %i%u%e trystterrr
Input:         t%y%t%r
Prediction:    tryster
Ground Truth:  tryster introspection
Input:         i%t%o%p%c%i%n
Prediction:    introspection
Ground Truth:  introspection

FIG. 8

930' — Create a group of error-ground truth word pairs with error words by substituting a symbol for a corresponding character in each ground truth word

FIG. 9B

930'' — Create a group of error-ground truth word pairs with error words by substituting two consecutive symbols for two corresponding consecutive characters in each ground truth word

FIG. 9C

930''' — Create a group of error-ground truth word pairs with error words by substituting a symbol for each alternate character in each ground truth word

FIG. 9D

DEEP-LEARNING BASED TEXT CORRECTION METHOD AND APPARATUS

CROSS-REFERENCE TO RELATED APPLICATION

The present application is related to U.S. application Ser. No. 17/491,122, filed Sep. 30, 2021, entitled "METHOD AND APPARATUS FOR CUSTOMIZED DEEP-LEARNING-BASED TEXT CORRECTION". The present application incorporates the entire contents of the identified application by reference.

BACKGROUND OF THE INVENTION

Spellchecking systems can detect typographical and spelling errors automatically when the user inputs a sequence of characters. Traditionally, such systems have used search algorithms from a fixed dictionary created by a pre-defined vocabulary. The error words have been pre-calculated and have used edited distance. With optical character recognition (OCR) and image character recognition (ICR), there often are two types of typographical errors, having different causes. OCR errors tend to occur because of typographical errors, incorrect pronunciation, or low image quality. ICR errors tend to occur because of misreading of the many different handwriting styles of different users.

FIG. 1 demonstrates the basic concept of dictionary-based methods for traditional spelling correctors. If the user's input is "Figere", then the algorithm generates modifications to this input using the edited distances. The algorithm could generate possible candidates, including but not limited to "Figude", "Figede", "Figuco", "Figgice" and "Figuac". By searching these generated candidates in the dictionary, it is possible to locate the possible correct word "Figure". If there are multiple "correct" candidates from the dictionary, the most likely word will be chosen by the highest probability from a frequency table which indicates a probability that a word will appear. This method, which works reasonably well for small dictionary searches, requires that the frequency table be available from the samples. However, for large vocabularies, computations of the edited candidates, and then searching those edited candidates one by one in the dictionary can be very expensive. Therefore, it is desired to have a high performance and accurate technique to leverage the quality of the OCR engine and/or ICR engine.

Deep learning (DL) based methods have become increasingly integral to development of large state-of-the-art models deployed in many areas such as digital documentation, natural language, medical imaging, social media, autopilot, sports and gaming. DL based methods have a number of advantages over traditional approaches in many aspects, such as generality, quality performance, and speed efficiency. Trainable network weights can be adapted to any nonparametric distribution and repeated pattern from a dataset. During training, the weights store the key information and retain the probabilities of each error word and its mapping to the correct word. The DL model can be utilized to fit the mapping from any error word to a ground truth word in the dataset. The mapping or the relationship between error and ground truth can be highly nonlinear, and cannot be programmed by simple rules.

For a number of reasons, it can be complicated to generate a training and testing dataset for developing a high-performance DL model than just choosing an appropriate network. For example, training dataset size can present a significant problem because of very large vocabulary size. For instance, for the word "Figure", it is possible to create training word pairs (error, ground truth) as follows: (Figuda, Figure), (Figeda, Figure), (Figuro, Figure), (Figuac, Figure), etc., and an anchor pair (ground truth, ground truth): (Figure, Figure); To generate all possible error-ground truth pairs, it is necessary to randomly replace each string (character) with a candidate character from among 26 letters and 10 digits (ignoring capital letters). The word "Figure" has six characters. Using only one edited distance distance for each letter, there are (26+10)*6 possible error-ground truth pairs. For a million word vocabulary, training dataset size can be extended easily to one hundred million. Therefore, the model cannot be trained for this existing approach. Moreover, in languages with larger alphabets and/or substantial character sets, such as Japanese, a candidate character string often may be several thousand characters long, making enumeration even more difficult than in the English engine development.

In addition, there can be contradictions in the training dataset, and/or a mismatch between the training dataset and the testing dataset. For example, FIG. 2 shows that, if a string in a word is replaced randomly, there can be overlap and conflict between error and ground truth pairs. For example, the error words "seej" and "seqk" could map to the same or different ground truths such as "seed" and "seek". In the training dataset, it is easy to generate both cases like (seej, seek) and (seej, seed) in the training dataset without a control. This can cause the engine to stop learning and also can result in saturation after a number of training epochs.

It would be desirable to provide a more efficient approach and technique for developing a DL based spelling checker.

SUMMARY OF THE INVENTION

In view of the foregoing, embodiments according to the present invention provide a text correction method and apparatus which take advantage of a greatly reduced number of error-ground truth pairs to train a deep learning model. To generate these error-ground truth pairs, different characters in a ground truth word are replaced with a symbol, not appearing in any ground truth words, to generate error words which are paired with that ground truth word to provide error-ground truth word pairs. This process may be repeated for all ground truth words for which training is to be performed. In embodiments, pairs of characters in a ground truth word may be replaced with a symbol to generate the error words which are paired with that ground truth word to provide error-ground truth word pairs. Again, this process may be repeated for all ground truth words for which training is to be performed. In embodiments, this technique may be applied to training of base model and end user models of the types discussed in the above-referenced patent application.

BRIEF DESCRIPTION OF THE DRAWINGS

Various aspects according to embodiments of the present invention now will be described in detail with reference to the following drawings, in which:

FIG. 8 shows examples of identification of text to be corrected;

FIGS. 9B-9D represent variations of the flow chart of FIG. 9A according to embodiments;

DETAILED DESCRIPTION OF EMBODIMENTS

Figure 1:
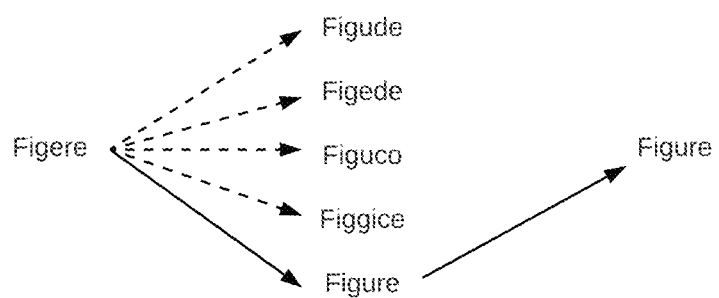
FIG. 1 is a diagram depicting dictionary based correction.
Figure 2:
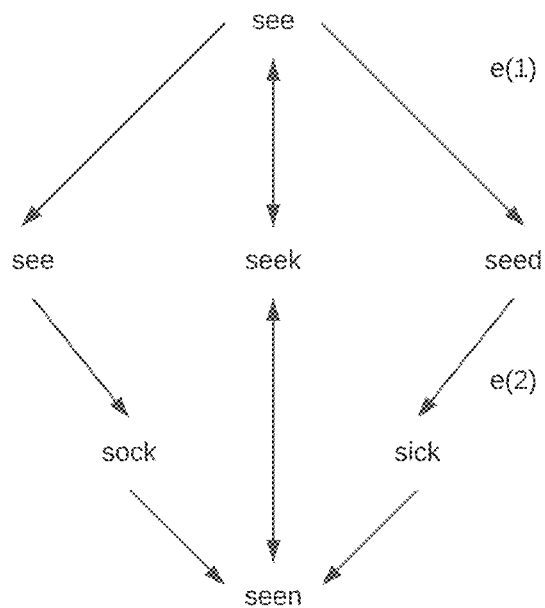
FIG. 2 is a diagram depicting word replacement.

Aspects of the present provide a computer-implemented text correction method comprising:
with a processor, generating a training dataset comprising a plurality of error-ground truth word pairs for a plurality of ground truth words, one or more of the plurality of error-ground truth word pairs comprising a ground truth word with a plurality of characters, and an error word with one or more symbols substituted for one or more of the plurality of characters in the ground truth word, the one or more symbols being a character not appearing in any of the plurality of ground truth words;
arranging, with a processor, the plurality of error-ground truth word pairs in one or more groups of one or more error-ground truth pairs, each group having error words with the one or more symbols arranged in a predetermined pattern; and selecting, with a processor, one or more of the one or more groups to train a deep learning (DL) model with the training dataset to perform text correction.

Aspects of the present provide a computer-implemented text correction apparatus comprising:
a processor; and
non-transitory memory containing instructions which, when performed by a processor, enable performance of a method comprising:
generating a training dataset comprising a plurality of error-ground truth word pairs for a plurality of ground truth words, one or more of the plurality of error-ground truth word pairs comprising a ground truth word with a plurality of characters, and an error word with one or more symbols substituted for one or more of the plurality of characters in the ground truth word, the one or more symbols being a character not appearing in any of the plurality of ground truth words;
arranging the plurality of error-ground truth word pairs in one or more groups of one or more error-ground truth pairs, each group having error words with the one or more symbols arranged in a predetermined pattern; and
selecting one or more of the one or more groups to train a deep learning (DL) model with the training dataset to perform text correction.

In an embodiment, the one or more groups may comprise a first group of error-ground truth word pairs, wherein, for each ground truth word in the plurality of ground truth words in the first group of error-ground truth word pairs, each error-ground truth word pair comprises the ground truth word and an error word with a symbol substituted for a different character in the ground truth word so that, for each ground truth word, there are a number of error words equal to a number of characters in the ground truth word.

In an embodiment, the one or more groups may comprise a second group of error-ground truth word pairs, wherein, for each ground truth word in the plurality of ground truth words in the second group of error-ground truth word pairs, each error-ground truth word pair comprises a ground truth word and an error word with a symbol substituted for two different successive characters in the ground truth word so that, for each ground truth word, there is one less error word than a number of characters in the ground truth word.

In an embodiment, the one or more groups may comprise a third group of error-ground truth word pairs, wherein, for each ground truth word in the plurality of ground truth words in the third group of error-ground truth word pairs, each error-ground truth word pair comprises a ground truth word and an error word with a symbol substituted for every other character in the ground truth word so that, for each ground truth word, there are two error words.

In an embodiment, in the third group of error-ground truth word pairs, each ground truth word may have one error word with even-numbered characters replaced by a symbol, and one error word with odd-numbered characters replaced by a symbol.

In an embodiment, the one or more groups may comprise a first group of error-ground truth word pairs and a second group of error-ground truth word pairs, wherein, for each ground truth word in the plurality of ground truth words in the first group of error-ground truth word pairs, each error-ground truth word pair comprises the ground truth word and an error word with a symbol substituted for a different character in the ground truth word; and wherein, for each ground truth word in the plurality of ground truth words in the second group of error-ground truth word pairs, each error-ground truth word pair comprises a ground truth word and an error word with a symbol substituted for two different successive characters in the ground truth word.

In an embodiment, the one or more groups may comprise a first group of error-ground truth word pairs, a second group of error-ground truth word pairs, and a third group of error-ground truth word pairs, wherein, for each ground truth word in the plurality of ground truth words in the first group of error-ground truth word pairs, each error-ground truth word pair comprises the ground truth word and an error word with a symbol substituted for a different character in the ground truth word; wherein, for each ground truth word in the plurality of ground truth words in the second group of error-ground truth word pairs, each error-ground truth word pair comprises a ground truth word and an error word with a symbol substituted for two different successive characters in the ground truth word; and wherein, for each ground truth word in the plurality of ground truth words in the third group of error-ground truth word pairs, each error-ground truth word pair comprises a ground truth word and an error word with a symbol substituted for every other character in the ground truth word.

In an embodiment, the text correction may comprise one or more of image character recognition (ICR) and optical character recognition (OCR).

In an embodiment, the method also may include, after the selecting, training the DL model with the training dataset.

In an embodiment, the method also may include, after the training, correcting input text using the trained DL model.

In the following description, different embodiments will use different ones of the following levels of error-ground truth pairs (referred to herein as levels 1 to 3). In addition, embodiments may use what is termed a "level 0", which is original text input.

Level 1. In an embodiment, during training dataset generation, instead of replacing a string (character) randomly to provide what is a very large set of error words, a string of one or more characters may be substituted with one or more symbols never used in a ground truth word. For example, if the word "Figure" is used for training dataset generation, instead of 26*6 error ground truth pairs which would result from using every possible letter in each position in the word, it is possible to generate only six error-ground truth pairs by replacing an unused symbol for each of the letters in "Figure". The resulting error-ground truth pairs would be as follows:

(% igure, Figure)
(F % gure, Figure)
(Fi % ure, Figure)
(Fig % re, Figure)
(Figu % e, Figure)
(Figur %, Figure)

These six error-ground truth pairs then can be used to train the DL model. This approach greatly reduces the error training space and makes the engine more easily trainable. Specifically, the number of error-ground truth pairs removed would be (26*6−6)/26*6=0.962, meaning a 96.2% reduction in the error training space.

Level 2. In an embodiment, five error-ground truth pairs may be generated by replacing a pair of symbols for two consecutive letters in "Figure". The resulting error-ground truth pairs would be as follows:

(%% gure, Figure)
(F %% ure, Figure)
(Fi %% re, Figure)
(Fig %% e, Figure)
(Figu %%, Figure)

These five error-ground truth pairs then can be used to train the DL model. This approach reduces the error training space even more and makes the engine more easily trainable. Specifically, the number of error-ground truth pairs removed would be (26*26*5−5)/26*26*5=.998, meaning a 99.8% reduction in the error training space.

Level 3. In an embodiment, to leverage training efficiency further and to reduce a number of contradictions, a symmetrical deletion technique may be employed in which a symbol may be substituted for every odd character in a word or every even character in a word. This technique generates two error-ground truth pairs. Looking again at the ground truth word "Figure", for the first pair, characters in odd positions in a string are replaced with the symbol. For the second pair, characters in even positions are replaced with the symbol. The resulting error-ground truth pairs would be as follows:

(% i % u % e, Figure)
(F % g % r %, Figure)

In this embodiment, it is possible to avoid a majority of contradictions in the training set and reduce an amount of training data by up to 90%. Ordinarily skilled artisans will appreciate that, for longer words, this symmetrical deletion technique may be particularly effective.

In this embodiment, at inference time, two masked versions of the error words are input. Agreement of symmetry then may be used to validate the corrections. If the inferences "% i % u % e" and "F % g % r %" are seen to be recovering each other's missing characters, and are mapping to the same word "Figure," then the correction word "Figure" may be considered to be final, and accordingly is output to the user. Otherwise, one of the most likely words is output using a two step inference, which provides two inferences for each masked word, e.g., "% i % u % e" to Figure; "F % g % r %" to Figure). If there is a symmetry or a reflection of the two inferences, meaning that the mapping is unique and of high probability, the result may be considered to be final, and accordingly is output to the user. Otherwise, two final candidate words may be output, from which a user may select the one that is correct.

During training, those error pairs may be grouped into one batch, and may be fed to the network in that batch for the word. The engine can focus on learning a global relationship between characters in the words while ignoring the effects of individual characters or of an inserted or replaced error character.

Figure 3:
FIG. 3 shows examples of levels of masks according to an embodiment.
Figure 3:
Figure 3:

FIG. 3 shows four levels of deletion and replacement to train the DL model according to an embodiment, in which levels 1-3 are as just described, and level 0 is original text input, as noted.

Ordinarily skilled artisans will appreciate that replacing too many consecutive letters in a ground truth word with symbols can yield a set of error-ground truth pairs that is not as effective or accurate. Artisans also will appreciate that, for longer ground truth words, it may be helpful to substitute three consecutive letters with symbols, or even more letters, with symbols. In this circumstance, for longer words, one approach may be to provide another level with substitution of three consecutive letters with symbols. For different languages, or different sequences of characters or words, particularly long word sequences, additional levels may be helpful. On the other hand, for such longer words, word sequences, or character strings, Level 3 may be sufficient by itself, without Levels 0-2.

In embodiments, depending on the input word, fewer than all of Levels 0-3 may be necessary. For example, Levels 1-3, or Levels 1 and 2 may be sufficient. For shorter words or character strings, all of Levels 0-3 may be necessary.

In embodiments, any of levels 1-3, individually or in any combination, may be used to train the DL model.

Ordinarily skilled artisans also will appreciate that the various levels of symbol substitution described above facilitate generation of synthetic training data sets.

In general, from the foregoing, it can be appreciated that context matters when attempting to translate an input word into the correct output. One way to provide that context may be a circumstance in which a customer provides a correction, for example, to a letter in a word. That letter, in that position in the word, will be known to be correct, and so will provide context for future training purposes. That corrected letter can be used in place of a symbol in error-ground truth pairs.

Context also can arise in the context of word sequences. For example, there may be common word sequences in which knowing what one of the words is provides context for limiting the universe of error words and hence the number of error-ground truth pairs. An example of such sequences may include the word "cell". There are many words which often go with the word "cell", and in particular in front of the word. A non-exhaustive list of examples includes "stem", "epithelial", "cancer", "animal", "human", "plant", "nerve", "spreadsheet", "solar", "fuel", "storage", "jail", and "prison".

There also are many words which follow the word "cell" to form a word pair. A non-exhaustive list of examples includes "block", "phone", "number", "biology", "division", "culture", "membrane", "division", "wall", and "structure".

Word combinations including a root word such as "cell" will appear in different contexts. In the word pairs above, biology, communications, criminology, and accounting or word processing are examples of fields of learning or knowledge which provide different contexts for the pairing of words to go with "cell".

Figure 4:
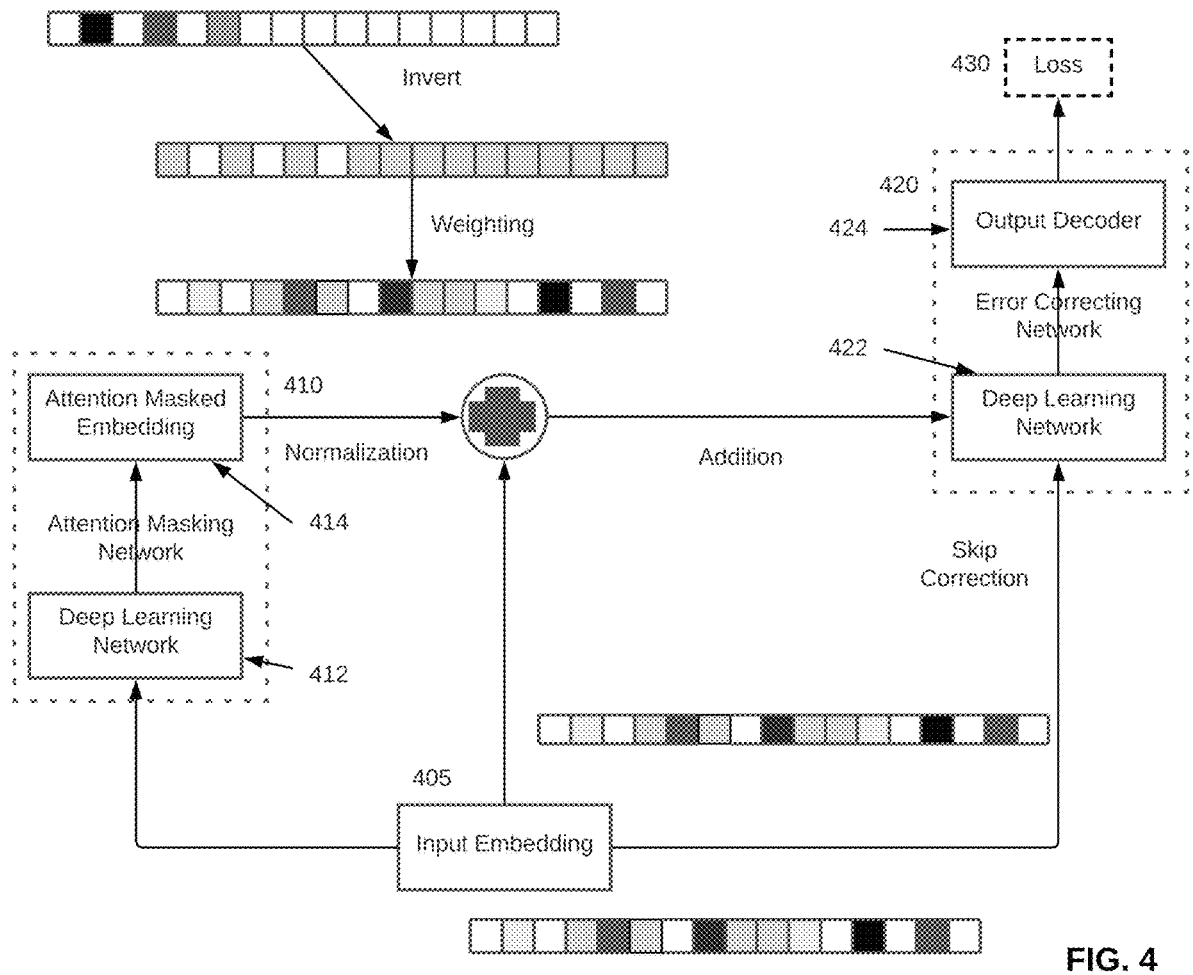
FIG. 4 is a high level diagram of a network according to an embodiment.
Figure 5:
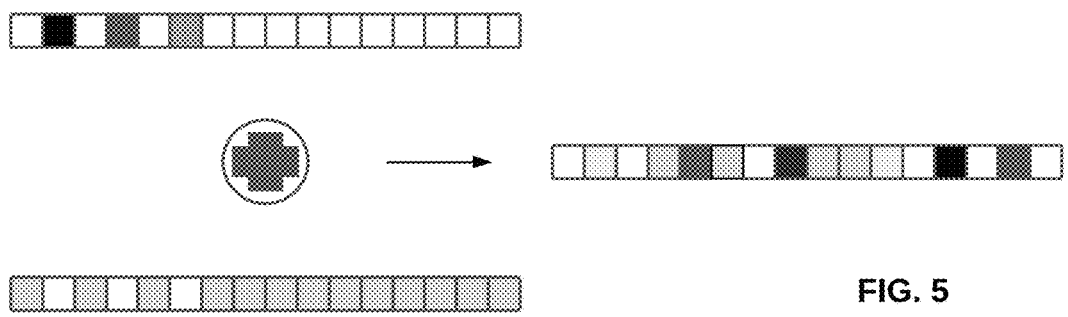
FIG. 5 shows examples of relevant masking positions according to an embodiment.

The following discussion of FIGS. 4 and 5 refer to masking positions.

FIG. 4 shows an OCR and ICR network, with details of modules inside a masking network (left) and a correction network (right). On the left side of FIG. 4, an attention masking network 410 masks all the positions that are related to incorrect characters. As described herein, according to various embodiments, the masks may comprise one or more symbols, placed in a particular manner depending on the level of error-ground truth pairs being applied. In an embodiment, the attention masking network 410 applies a deep learning algorithm 412 to create a masked feature vector to be incorporated with an input vector for the correction network to decode for the final output. In an embodiment, the deep learning algorithm 412 is a bi-directional long short-term memory (Bi-LSTM).

On the right side of FIG. 4, a correction network 420 outputs a final sequence regarding to the input sequence. In an embodiment, correction network 420 includes a deep learning network 422. In an embodiment, deep learning network 422 may be a Bidirectional Encoder Representations from Transformers (BERT) network. In another embodiment, the network 422 may be a Bi-LSTM network. In another embodiment, network 422 may be a neural machine translation (NMT) network.

In an embodiment, an output of output decoder 424 in error correcting network 420 passes to loss block 430. In an embodiment, loss block 430 computes Connectionist Temporal Classification (CTC) loss. In another embodiment, loss block 430 may compute multilayer perceptron (MLP) with cross-entropy (CE) loss.

FIG. 5 shows examples of relevant masking positions. FIG. 5 shows vector composition (error masking embedding), in which the masked relevant positions are labeled as black and gray cubes (in the top sequence), while gray shows the original embedding vector of the input word (in the bottom sequence). The masked embedding vector is the input for the error correcting network 420 at the right hand side of FIG. 4.

Figures 6, 7:
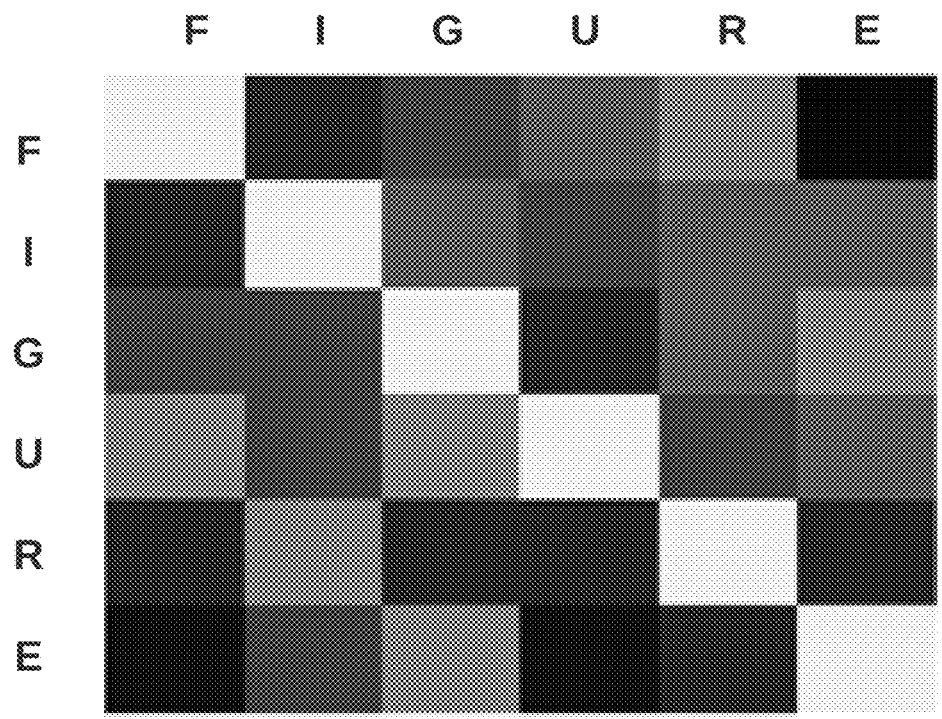
FIG. 6 is a table showing strengths of relationships between characters in accordance with embodiments.
FIG. 7 is a table showing strengths of relationships between characters in accordance with embodiments.

A self-learned attention matrix is a matrix that contains correlations between individual characters. FIG. 6 shows an example of a trained self-learned attention matrix between the characters in the word "FIGURE". In this example, darker shades indicate weaker relations, while lighter shades indicate stronger relations. In FIG. 6, the matrix shows strong and weak relationships between characters. This attention matrix is trainable, and may be included in the model.

The attention mask can be learned through the supervised learning, and is strongly connected by the error mode and pattern of the input and ground truth text. The training dataset can be generated using edited distance (Levenshtein distance) between two sequences. The Levenshtein distance can measure the alignment between two related sequences. The minimum edited distance is calculated through an iterative process in the algorithm. Generally, there are several edits used in the Levenshtein distance: (1) replace; (2) insert; (3) delete.

FIG. 7 depicts an example of Levenshtein Distance between two words: the error word 'Lavenshtien' and the ground truth word 'Levenshtein'. The table in FIG. 7 shows distances between each possible aligned subsequence.

To generate a training pair to train the mask network, the results are converted from Levenshtein distances. Every edited position is marked, and a binary mask applied to represent correct and incorrect positions. Accordingly, for the FIG. 7 example of 'Lavenshtien' and 'Levenshtein', the labeling vector will be "010000001100" corresponding to three modifications: "replace a with e", "insert e behind t", and "delete e behind i".

In an embodiment, differing lengths between an input sequence and a ground truth sequence may be handled. For any insertion and deletion, there will be no addition of an extra length of digits to align with the ground truth sequence. For example, if the length of an input error word is '11' for 'Lavenshtien', the ground truth vector length still should be '11' with insertion and deletion operations. Deletion and insertion will change the length mapping between the input and target sequences. In an embodiment, a maximum number of deletion and insertion operations should not be less than half of the original characters in the ground truth word.

FIG. 8 depicts results of the masking techniques according to an embodiment. The results show an example of learned character relationship and inferred words in view of masked positions. These results demonstrate that a DL spellchecking model can be trained in this very efficient robust manner to learn spatial relationships between the characters and masked positions. With the inventive technique, it is not necessary to create all possible error words for a ground truth word. As a result, it is possible to provide substantial savings in both training time and training corpus size. In addition, training can be adapted easily to a self-attention network such as a transformer network, which is a state-of-art network that can provide good performance for many natural language processing (NLP) tasks.

Figure 9A:
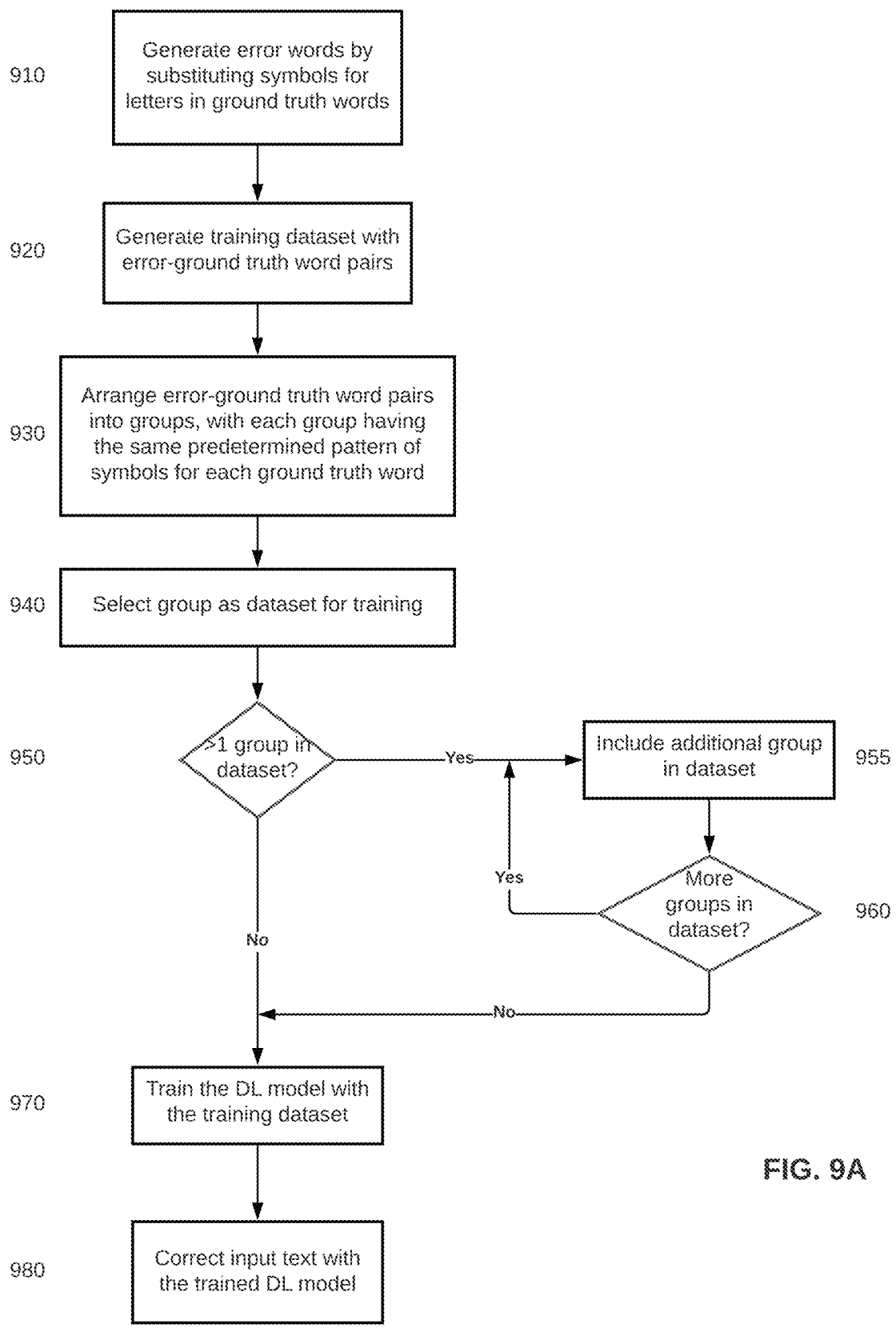
FIG. 9A is a flow chart depicting, at a high level, DL model training and text correction according to an embodiment.

FIG. 9A is a flow chart depicting a sequence of operation of the inventive system according to an embodiment. At 910, error words are generated by substituting one or more symbols for letters in ground truth words, the symbols not appearing as any characters in any of the ground truth words. In an embodiment, only one type of substitution is made at this point. In other embodiments, more than one type of substitution may be made.

At 920, the generated error words are matched with their ground truth words to generate a training dataset comprised of error-ground truth word pairs. At 930, the error-ground truth word pairs are arranged into groups, with each group having the same predetermined pattern of symbols for each ground truth word. The resulting group are pairs comprising the ground truth words in the dataset, matched with error words having the same predetermined pattern of symbols for the corresponding ground truth words.

At 940, a generated group is selected as the dataset for training the DL. At 950, it is determined whether there will be more than one group, each with a different pattern, in the dataset. If so, then at 955 another generated group is added. At 960, it is determined whether there will be more groups in the dataset. If so, then flow returns to 955. If not, the dataset is complete, and at 970, the DL model is trained with that dataset. At 980, input text is corrected with the trained DL model.

FIG. 9B shows a variant 930' of 930 in FIG. 9A in which a group of error-ground truth word pairs is generated by substituting a symbol for each of the corresponding characters in a ground truth word to generate a set of error-ground truth word pairs for that ground truth word. A number of word pairs in that set would equal a number of characters in that ground truth word. The group then would comprise one of those sets for each ground truth word.

FIG. 9C shows a variant 930" of 930 in FIG. 9A in which a group of error-ground truth word pairs is generated by substituting two consecutive symbols for two corresponding consecutive characters in a ground truth word to generate a set of error-ground truth word pairs for that ground truth word. A number of word pairs in that set would equal one less than a number of characters in that ground truth word. The group then would comprise one of those sets for each ground truth word.

FIG. 9D shows a variant 930''' of 930 in FIG. 9A in which a group of error-ground truth word pairs is generated by substituting a symbol for each alternate character in a ground truth word to generate a set of error-ground truth word pairs for that ground truth word. A number of word pairs in that set would be two, one with symbols substituted for even numbered characters, and one with symbols substituted for odd numbered characters. The group then would comprise one of those sets for each ground truth word.

It should be noted that the sequence of operation of at least some of 910-980 is not critical. For example, any of 930', 930", or 930''' could be performed in lieu of 910, so that only one group at a time is generated. Additionally or alternatively, any two or more of 930', 930", or 930''' could be performed in lieu of 910, to generate two or more groups at a time. Still further, all of 930', 930", or 930''' could be performed in lieu of 910, to generate three groups at a time.

Figure 10:
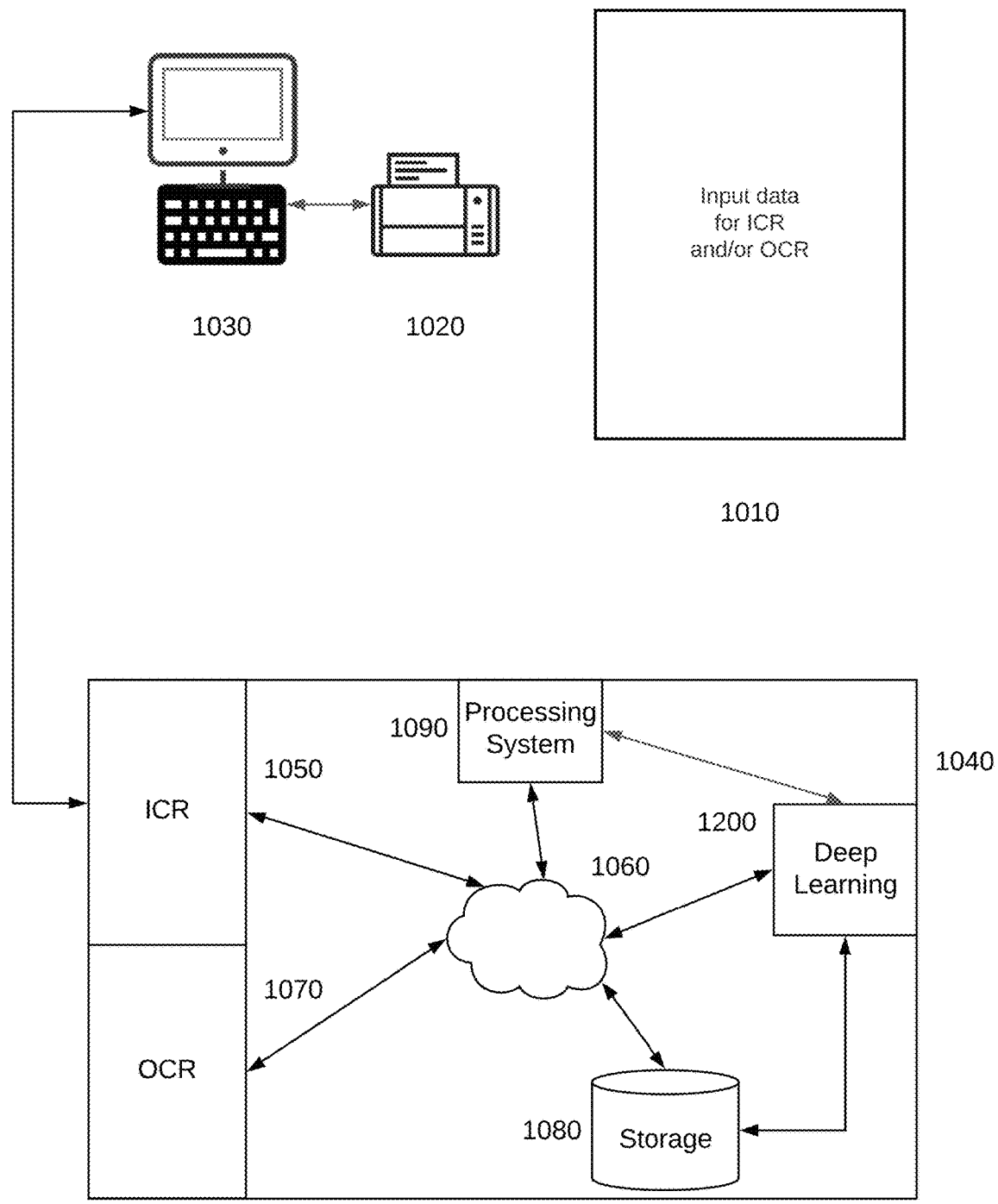
FIG. 10 shows a high-level example of a system for receiving input data and training a DL model according to an embodiment.

FIG. 10 is a high-level diagram of a system to train and implement a DL model according to an embodiment. In FIG. 10, input text 1010 may be provided via a scanner or other input device 1020 to an ICR module 1050 or OCR module 1070 depending on the text recognition process to be carried out. A processing system 1040 may include a processing module 1090, which may communicate with either ICR module 1050 or OCR module 1070 as appropriate or necessary to provide requisite processing power, via one or more central processing units (CPUs) or graphics processing units (GPUs) and associated non-transitory storage and/or non-transitory memory. In an embodiment, processing system 1040 may communicate directly with either computer 1030 or scanner/input device 1020. Processing system 1040 may be self-contained, or may have its various elements connected via a network or cloud 1060. One or both of ICR module 1050 or OCR module 1070, each of which may have its own CPUs and/or GPUs, may communicate with processing module 1090 via the network or cloud 1060.

Deep learning system 1200, which will be described in more detail below with reference to FIG. 12, handles changes to the DL model.

Figure 11:
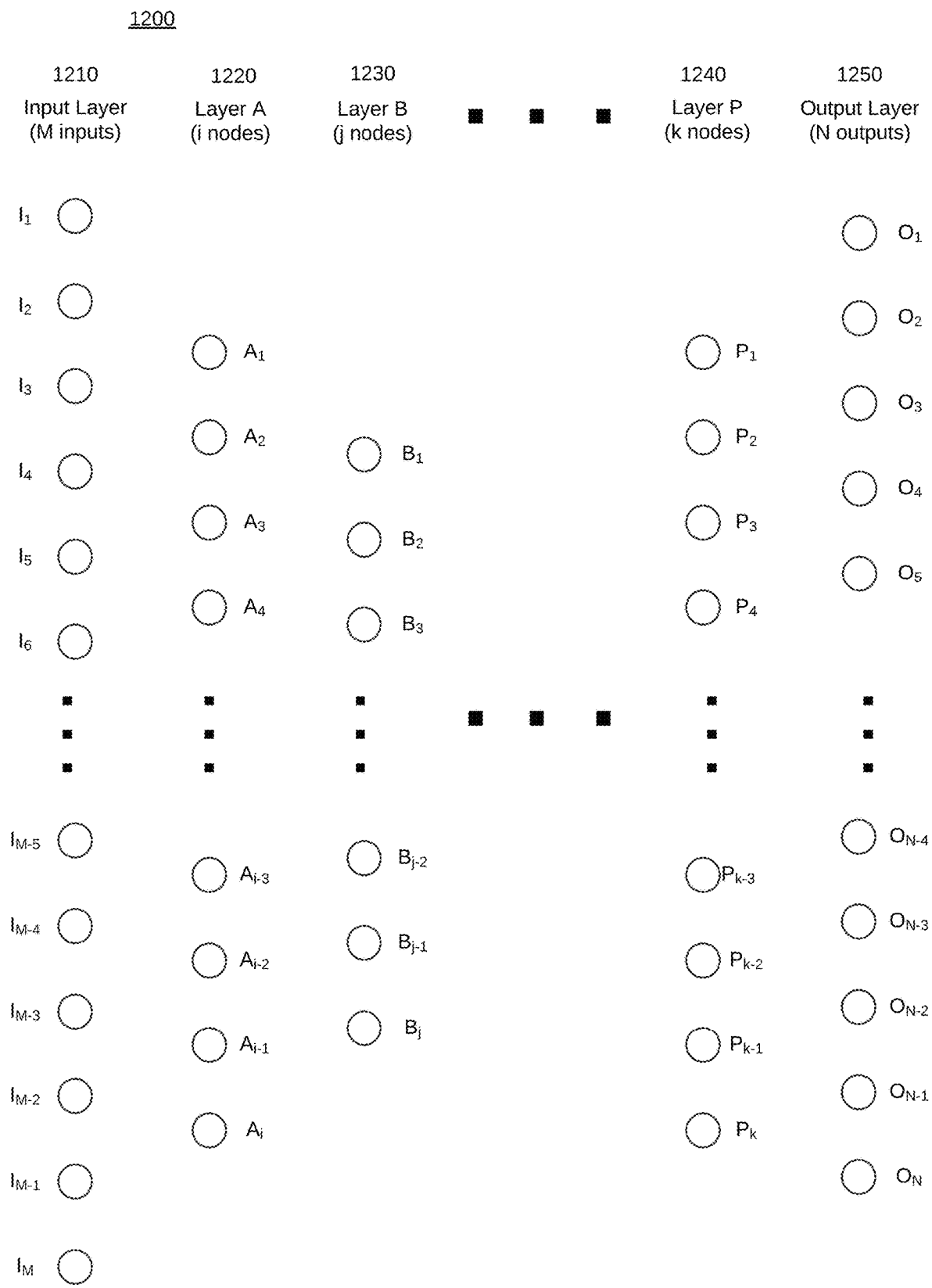
FIG. 11 shows a high-level example of nodes for a DL model according to an embodiment.

FIG. 11 is a high-level diagram of a DL model according to an embodiment. DL model 1200 has an input layer 1210 comprising a plurality of nodes. Depending on the system, there may be one or more intermediate layers 1220-1240 (FIG. 11B shows P such layers, where P is a positive integer), each of the intermediate layers in turn comprising a plurality of nodes. There also may be an output layer 1250.

Figure 12:
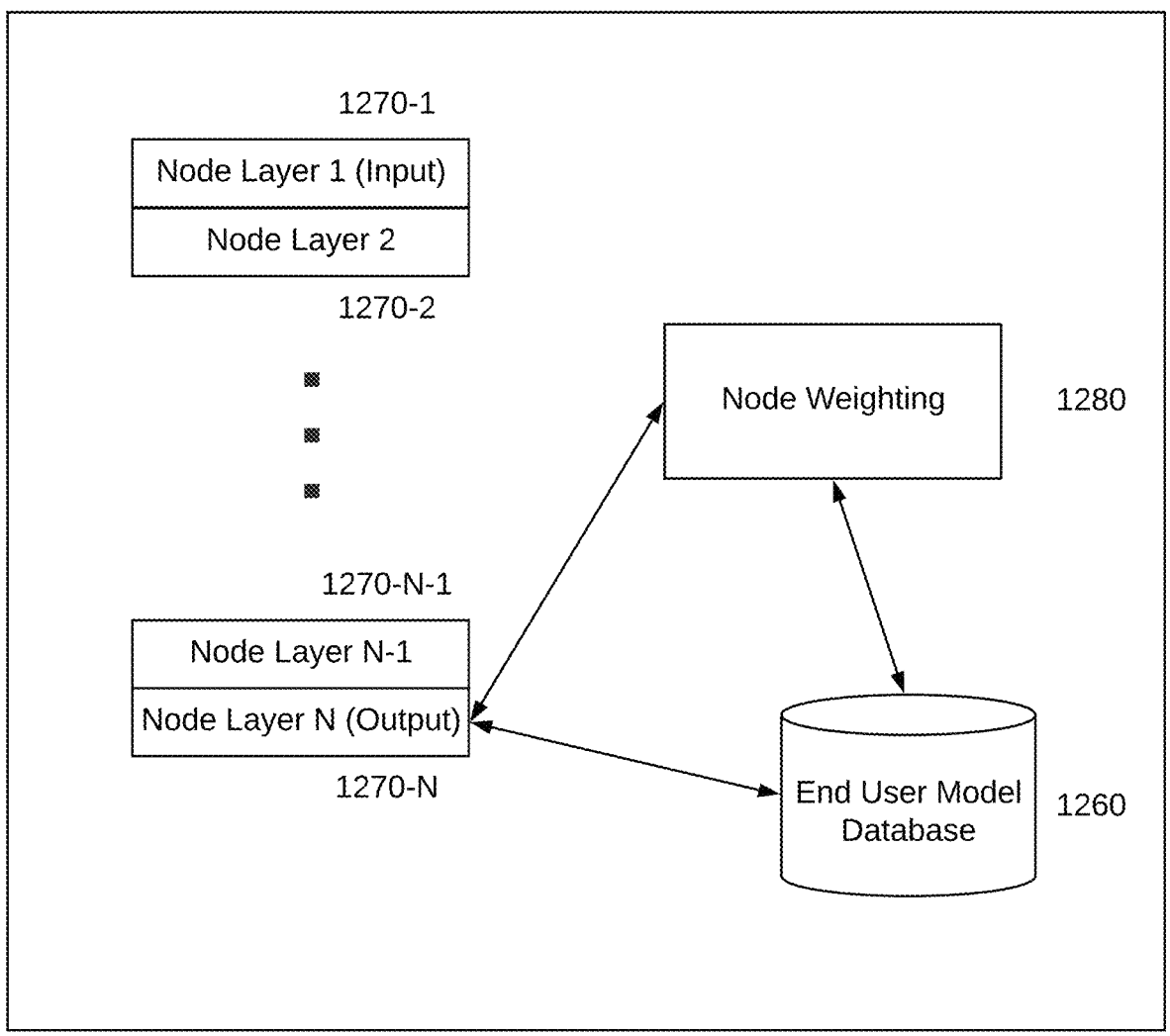
FIG. 12 shows a high-level example of a DL system for model training according to an embodiment.

FIG. 12 shows a little more detail of deep learning system 1200. Database 1260 stores weights and data for the model. Node weighting module 1270 calculates weights for the various nodes in the various layers based on comparison with results, among other things, and assigns those weights to layers 1270-1, 1270-2, . . . 1270-N-2, 1270-N-1, and 1270-N accordingly.

The techniques described herein are applicable to a base model deep learning system and/or an end user model deep learning system as described in the above-referenced US patent application. That application concerns, among other things, user-customizable DL models which work from a base model which has been trained in a more general way. For example, a base model may have an input layer and a certain number of intermediate layers. Depending on the embodiment, the last intermediate layer may be an output layer, or it may be a layer preceding a further layer or layers in an end user model. In any event, the error-ground truth pair techniques described herein may be used to train either a base model or an end user model. In embodiments, a base model will have a more generic vocabulary, while different end user models may have different specific vocabularies associated with them.

In an embodiment in the above-referenced US patent application, end users are unable to modify the base model themselves. End user changes focus on the particular end user needs around an output layer of the overall DL model. In deep learning model embodiments employing backpropagation, weighting of nodes in one or more of the input or intermediate layers of the end user model deep learning system may be altered. Such alterations may filter back to the base model in some form, depending on how datasets from different end users are presented to the base model deep learning system, and on how large those datasets are, among other things. These and other possibilities were discussed in more detail above. Fundamentally, however, even if the end user model provides outputs indicating that any weightings in the base model need to be changed, such change will occur at the host side, which controls the base model.

While aspects of the present invention have been described in detail with reference to various drawings, ordinarily skilled artisans will appreciate that there may be numerous variations within the scope and spirit of the invention. Accordingly, the invention is limited only by the following claims.

What is claimed is:

1. A computer-implemented text correction method comprising:
   with a processor, generating a training dataset comprising a plurality of training word pairs, each of the plurality of training word pairs comprising a ground truth word with a plurality of characters, and an error word comprising the ground truth word with one or more symbols substituted for a respective one or more of the plurality of characters in the ground truth word, the one or more symbols being different from characters in a character set and not being used to spell any of the plurality of ground truth words;
   arranging, with a processor, the plurality of training word pairs in one or more groups of one or more training word pairs, each group having error words with the one or more symbols arranged in a predetermined pattern; and
   selecting, with a processor, one or more of the one or more groups to train a deep learning (DL) model with the training dataset to perform text correction.

2. The computer-implemented text correction method of claim 1, wherein the one or more groups comprise a first group of training word pairs;
   wherein, for each ground truth word in the plurality of ground truth words in the first group of training word pairs, each training word pair comprises the ground truth word and an error word with a symbol substituted for a different character in the ground truth word so that, for each ground truth word, there are a number of error words equal to a number of characters in the ground truth word.

3. The computer-implemented text correction method of claim 1, wherein the one or more groups comprise a second group of training word pairs;
wherein, for each ground truth word in the plurality of ground truth words in the second group of training word pairs, each training word pair comprises a ground truth word and an error word with a symbol substituted for two different successive characters in the ground truth word so that, for each ground truth word, there is one less error word than a number of characters in the ground truth word.

4. The computer-implemented text correction method of claim 1, wherein the one or more groups comprise a third group of training word pairs;
wherein, for each ground truth word in the plurality of ground truth words in the third group of training word pairs, each training word pair comprises a ground truth word and an error word with a symbol substituted for every other character in the ground truth word so that, for each ground truth word, there are two error words.

5. The computer-implemented text correction method of claim 4, wherein, in the third group of training word pairs, each ground truth word has one error word with even-numbered characters replaced by a symbol, and one error word with odd-numbered characters replaced by a symbol.

6. The computer-implemented text correction method of claim 1, wherein the one or more groups comprise a first group of training word pairs and a second group of training word pairs;
wherein, for each ground truth word in the plurality of ground truth words in the first group of training word pairs, each training word pair comprises the ground truth word and an error word with a symbol substituted for a different character in the ground truth word; and
wherein, for each ground truth word in the plurality of ground truth words in the second group of training word pairs, each training word pair comprises a ground truth word and an error word with a symbol substituted for two different successive characters in the ground truth word.

7. The computer-implemented text correction method of claim 1, wherein the one or more groups comprise a first group of training word pairs, a second group of training word pairs, and a third group of training word pairs;
wherein, for each ground truth word in the plurality of ground truth words in the first group of training word pairs, each training word pair comprises the ground truth word and an error word with a symbol substituted for a different character in the ground truth word;
wherein, for each ground truth word in the plurality of ground truth words in the second group of training word pairs, each training word pair comprises a ground truth word and an error word with a symbol substituted for two different successive characters in the ground truth word; and
wherein, for each ground truth word in the plurality of ground truth words in the third group of training word pairs, each training word pair comprises a ground truth word and an error word with a symbol substituted for every other character in the ground truth word.

8. The computer-implemented text correction method of claim 1, wherein the text correction comprises one or more of image character recognition (ICR) and optical character recognition (OCR).

9. The computer-implemented text correction method of claim 1, further comprising:
after the selecting, training the DL model with the training dataset.

10. The computer-implemented text correction method of claim 9, further comprising:
after the training, correcting input text using the trained DL model.

11. A computer-implemented text correction apparatus comprising:
a processor; and
non-transitory memory containing instructions which, when performed by a processor, enable performance of a method comprising:
generating a training dataset comprising a plurality of training word pairs, each of the plurality of training word pairs comprising a ground truth word with a plurality of characters, and an error word comprising the ground truth word with one or more symbols substituted for a respective one or more of the plurality of characters in the ground truth word, the one or more symbols being different from characters in a character set and not being used to spell any of the plurality of ground truth words;
arranging the plurality of training word pairs in one or more groups of one or more training word pairs, each group having error words with the one or more symbols arranged in a predetermined pattern; and
selecting one or more of the one or more groups to train a deep learning (DL) model with the training dataset to perform text correction.

12. The computer-implemented text correction apparatus of claim 11, wherein the one or more groups comprise a first group of training word pairs;
wherein, for each ground truth word in the plurality of ground truth words in the first group of training word pairs, each training word pair comprises the ground truth word and an error word with a symbol substituted for a different character in the ground truth word so that, for each ground truth word, there are a number of error words equal to a number of characters in the ground truth word.

13. The computer-implemented text correction apparatus of claim 11, wherein the one or more groups comprise a second group of training word pairs;
wherein, for each ground truth word in the plurality of ground truth words in the second group of training word pairs, each training word pair comprises a ground truth word and an error word with a symbol substituted for two different successive characters in the ground truth word so that, for each ground truth word, there is one less error word than a number of characters in the ground truth word.

14. The computer-implemented text correction apparatus of claim 11, wherein the one or more groups comprise a third group of training word pairs;
wherein, for each ground truth word in the plurality of ground truth words in the third group of training word pairs, each training word pair comprises a ground truth word and an error word with a symbol substituted for every other character in the ground truth word so that, for each ground truth word, there are two error words.

15. The computer-implemented text correction apparatus of claim 14, wherein, in the third group of training word pairs, each ground truth word has one error word with even-numbered characters replaced by a symbol, and one error word with odd-numbered characters replaced by a symbol.

16. The computer-implemented text correction apparatus of claim 11, wherein the one or more groups comprise a first group of training word pairs and a second group of training word pairs;
   wherein, for each ground truth word in the plurality of ground truth words in the first group of training word pairs, each training word pair comprises the ground truth word and an error word with a symbol substituted for a different character in the ground truth word; and
   wherein, for each ground truth word in the plurality of ground truth words in the second group of training word pairs, each training word pair comprises a ground truth word and an error word with a symbol substituted for two different successive characters in the ground truth word.

17. The computer-implemented text correction apparatus of claim 11, wherein the one or more groups comprise a first group of training word pairs, a second group of training word pairs, and a third group of training word pairs;
   wherein, for each ground truth word in the plurality of ground truth words in the first group of training word pairs, each training word pair comprises the ground truth word and an error word with a symbol substituted for a different character in the ground truth word;
   wherein, for each ground truth word in the plurality of ground truth words in the second group of training word pairs, each training word pair comprises a ground truth word and an error word with a symbol substituted for two different successive characters in the ground truth word; and
   wherein, for each ground truth word in the plurality of ground truth words in the third group of training word pairs, each training word pair comprises a ground truth word and an error word with a symbol substituted for every other character in the ground truth word.

18. The computer-implemented text correction apparatus of claim 11, wherein the text correction comprises one or more of image character recognition (ICR) and optical character recognition (OCR).

19. The computer-implemented text correction apparatus of claim 11, wherein the method further comprises:
   after the selecting, training the DL model with the training dataset.

20. The computer-implemented text correction apparatus of claim 19, wherein the method further comprises:
   after the training, correcting input text using the trained DL model.

\* \* \* \* \*